Patented Oct. 29, 1935

2,019,363

UNITED STATES PATENT OFFICE 2,019,363

PREPARATION OF JELLY-FORMING ORGANIC SUBSTANCES

Rudolf Georg Schulz, Dusseldorf - Holthausen, Germany, assignor to firm Henkel & Cie. Gesellschaft mit beschrankter Haftung, Dusseldorf, Germany No Drawing. Application June 21, 1932, Serial No. 618,578. In Germany August 26, 1931

9 Claims. (Cl. 252—1)

It is a well-known fact, that when finely pulverized organic substances, which possess the ability of forming jellies, are mixed with swelling agents or solvents, lumps or clots are usually formed, and that it therefore is very difficult and in many cases impossible to obtain homogeneous products. The formation of such undesirable lumps or pellets is mainly due to the circumstance, that, when the powder and solvents are stirred together, parts of the powder will swell so rapidly to a jelly that other parts of the powder, which have not swelled at all or have only partially swelled, are surrounded by this jelly. Such lumps in many cases do not swell at all. In other cases great difficulties are encountered in causing such lumps to swell to a homogeneous solution. It is often impossible to convert these lumps into a uniform solution, even after they have been subjected to a prolonged heat treatment, since in this case sensitive substances, such as pectines, exhibit decomposition phenomena which render the whole product useless.

On account of the difficulties mentioned above it has hitherto been common practice to sift out the finer particles of such materials and to place upon the market only grains of certain definite sizes. The fine particles sifted out had to be dissolved anew and to be subjected to the same treatment as before. This mode of operation of course can be carried out only under certain circumstances and can not be used at all when the substances to be treated are of such nature that the repeated dissolving is likely to cause a hydrolytical decomposition of the same.

Extensive investigations made by the inventor have now shown, that the formation of lumps is bound to occur during the swelling or dissolving of said pulverulent substances when the grain size of the material lies below a certain limit which is dependent upon the manner in which the swelling of such material takes place. In accordance with the invention the formation of lumps is prevented by converting the too finely pulverized substances into larger more or less porous particles. These porous aggregates consist of small sponge-like particles which will swell more uniformly than the too finely pulverized particles themselves could swell before the aggregation.

The principal advantage of such aggregated bodies consists in the fact that, on account of the capillaries in the same, the solvent is drawn from the outer surfaces into the innermost parts of the bodies and the formation of lumps is prevented. By means of the capillaries the entire mass is uniformly and thoroughly moistened and a uniformly swelling product or solution is obtained.

The purely physical principle on which the invention is based, which consists in aggregating the too finely pulverized substances into coarser particles, may be brought into effect in numerous different ways, for instance by subjecting said substances to a heat treatment in the presence of moisture at temperatures of from approximately 141° C. to approximately 180° C., without altering the state of matter of the substances, and without forming a solution.

The too finely pulverized substances may be moistened with small amounts, for instance 2–3%, of a solvent whereupon the moistened mass is treated between heated faces and the obtained flakes or cakes are reduced to grains of the desired size.

When water or aqueous fluids are used as solvents it will, when a certain percentage of water is present be sufficient to subject the too fine powder to a simple sintering treatment at a somewhat raised temperature.

The too fine powders may also be introduced into hot, organic fluids in which they are substantially insoluble or soluble to only a degree. This treatment may also be reversed by introducing into the heated powder finely distributed fluids adapted to cause the powder to form into aggregates of the desired size.

*Example 1.*—Flour of carob kernels, to which a small amount of moisture has been added, is passed over hot rollers having a temperature of about 180° C. and the flakes or cakes formed are reduced to groats. When this product is stirred with cold water it will swell to a jelly of excellent properties.

*Example 2.*—10 parts of flour of acacia gum, to which a small amount of moisture has been added, are introduced into 100 parts of boiling xylol. The porous masses produced are skimmed off, freed from the attached solvent and reduced to the proper size. When the aggregated particles are stirred with water no lumps are formed.

The invention may be utilized in numerous branches of the industry, for instance in the production of pharmaceutical products, provisions, detergents, adhesives, dressing, and sizing agents, lacquers, color-binding agents and the like and in any other process in which a fine powder is stirred with a liquid medium and in which it is of importance to avoid the formation of lumps.

The novel process may for instance be employed with the following substances as starting materials:

Rubber, guttapercha, balata, blown soap, detergents, saponins, vegetable mucilages such as carrageen, agar-agar, tragacanth gum, quince mucilage, Islandic moss, flour of carob kernels, mistletoe mucilage (viscin), albuminous substances, tanning agents, galls, glue, gelatines, pectins, plant gums, resins, gum resins, waxes, carbohydrates such as starch preparations, dextrines and the like, glucosides, animal galls and any preparations produced from these substances.

The novel process may of course as desired be carried out continuously or discontinuously.

I claim:—

1. A process of treating pulverulent jelly-forming organic substances to prevent them from forming lumps when swelling or dissolving, comprising subjecting the substances, in finely pulverized form, to temperatures substantially no higher than approximately 180° C. in the presence of approximately 3% moisture for a sufficient length of time to cause them to form coarser, porous aggregates, without effecting any substantial gellation of said substances, and without forming a solution.

2. A process of treating pulverulent jelly-forming organic substances to prevent them from forming lumps when swelling or dissolving, comprising subjecting the substances, in finely pulverized form, to temperatures substantially no higher than approximately 180° C. in the presence of approximately 3% moisture for a sufficient length of time to cause them to form coarser, porous aggregates, without effecting any substantial gellation of said substances and without forming a solution, and reducing said aggregates to grains of a predetermined size.

3. The process of treating pulverulent jelly-forming organic substances so that they will not form into lumps when they are subsequently subjected to a swelling or dissolving action in a jelly-forming solvent, which comprises introducing said substances in the presence of moisture, into an organic fluid in which they are substantially insoluble and which has been heated to temperatures sufficiently high to convert them into coarse, porous aggregates, and yet not sufficiently high to effect any substantial gellation of said substances.

4. The process described in claim 3, together with the further step of reducing said porous aggregates to grains of a predetermined size.

5. The process described in claim 3, wherein said substances are converted by said process into coarse aggregates having capillary passages extending therethrough.

6. The process described in claim 3, wherein said organic fluid is heated to a temperature of approximately 141° C.

7. The process described in claim 3, wherein said organic fluid consists of boiling xylol.

8. The process of treating pulverulent jelly-forming organic substances so that they will not lump or clot when they subsequently undergo a swelling or dissolving action in a jelly-forming solvent, which comprises bringing said substances in finely divided form, in the presence of moisture, into contact with xylol, which has been heated to a temperature in the neighborhood of 141° C., for converting said substances into coarser, porous aggregates, without effecting any substantial gellation thereof.

9. The process described in claim 8, together with the further step of separating said aggregates from said xylol and reducing them to particles of a predetermined size.

RUDOLF GEORG SCHULZ.